United States Patent [19]

Moyer

[11] Patent Number: 5,894,562
[45] Date of Patent: Apr. 13, 1999

[54] METHOD AND APPARATUS FOR CONTROLLING BUS ARBITRATION IN A DATA PROCESSING SYSTEM

[75] Inventor: William C. Moyer, Dripping Springs, Tex.

[73] Assignee: Motorola, Inc., Schaumburg, Ill.

[21] Appl. No.: 08/738,515

[22] Filed: Oct. 28, 1996

[51] Int. Cl.[6] .................................................. G06F 13/36
[52] U.S. Cl. ........................ 395/293; 395/288; 395/856; 395/726; 395/729; 395/728
[58] Field of Search ................................. 395/293, 287, 395/288, 290, 856, 860, 726, 728, 729, 732

[56] References Cited

U.S. PATENT DOCUMENTS

| | | |
|---|---|---|
| 5,068,781 | 11/1991 | Gillett et al. ............................ 395/288 |
| 5,430,848 | 7/1995 | Waggener ................................ 395/557 |
| 5,710,891 | 1/1998 | Normoyle et al. ....................... 395/299 |

OTHER PUBLICATIONS

Motorola Inc. Apr. 1985 Semiconductors Advance Info., "MC68008 8-/32-Bit Microprocessor with 8-Bit Data Bus", pp. 4-10 -4-21.

Motorola Inc., pub. by Prentice Hall, Englewood Cliffs, N.J., "MC68020 32-Bit Microprocessor User's Manual", Third Edition, pp. 7-40 -7-45.
Motorola Inc. 1990, DSP56116 User's Manual, "DSP56116 Digital Signal Processor User's Manual", pp. 8-2 -9-3.

*Primary Examiner*—Ayaz R. Sheikh
*Assistant Examiner*—Ario Etienne

[57] ABSTRACT

A method of controlling bus arbitration using an arbitration bit to lock ownership of the bus and prevent bus grants pending completion of a predetermined sequence. In a data processing system (15) having multiple potential bus masters, competing bus ownership requests are resolved by an arbiter (9) resident on one of the bus masters (11). In one embodiment, for execution of a sequence of inseparable cycle data accesses, a central processing unit (3) causes an arbitration bit (22) in a control register (20) to be set. Once the arbitration bit (22) is set, the arbiter will effectively lock the bus, and will not provide a bus grant signal until the arbitration bit (22) is cleared. A timer (7) counts to a predetermined value, where upon completion the arbitration bit is cleared allowing arbiter (9) to provide bus grant signals. The present invention allows locking of bus arbitration during a pending inseparable sequence of data accesses without the use of special instructions or external signals.

15 Claims, 3 Drawing Sheets

METHOD AND APPARATUS FOR CONTROLLING BUS ARBITRATION IN A DATA PROCESSING SYSTEM

FIELD OF THE INVENTION

The present invention relates to methods of controlling bus arbitration the data processing system, and specifically to blocking arbitration of an external bus during a sequence of consecutive bus cycles through software means.

BACKGROUND OF THE INVENTION

Many data processing systems contain multiple bus masters. Bus arbitration logic is typically used to select one out of the several requesting masters. The selected request will then gain bus mastership. The selection may be made in any of a number of ways, including, round-robin, fairness, strict priority, or any of a number of selection methods. Selection algorithms can range from the extremely complex to the extremely simple. Once a bus arbiter assigns bus mastership to a master, that master is said to "own" the bus.

In many systems a need arises for a master to hold ownership of the bus for the duration of several transfers. This holding of ownership is necessarily without interruption of ownership. It is often necessary to ensure an indivisible sequence of accesses for a given sequence of transfers. One example of the necessity of ownership holding is in a semaphore operation. Semaphore operations involve a series of read and write accesses. Typically, an indication is provided, such as a LOCK attribute, to an initial portion of the sequence of transfers. The indication prevents bus arbitration logic from reallocating ownership of the bus. Once locked, the current master holds ownership for the duration of the locked transfers.

Another example of necessary bus ownership holding is for a read-modify-write cycle. The read-modify-write cycle performs a sequence similar to the following steps: initially read a memory location, then conditionally modify the data in the arithmetic logic unit, and finally write the data out to the same memory location. Motorola Semiconductor located in Austin, Tx. produces several devices having these type of operations. In Motorola's MC68020 processor, the read-modify-write operation is indivisible, providing semaphore capabilities in multi-processor systems. During the entire read-modify-write sequence, the MC68020 asserts a signal to indicate that an indivisible operation is occurring. The MC68020 does not issue a bus grant (BG) signal in response to a bus request (BR) signal during this operation. The MC68020 has two instructions which utilize read-modify-write operations. The first is the test-and-set (TAS) and the second is the compare-and-swap (CAS).

Consider a simple system, having two possible bus masters. One of the masters is designated as the default bus master and a second master is designated as the higher priority master. The default bus master has the lowest priority and grants bus ownership to the higher priority master in response to receipt of a bus request. In this case bus arbitration logic is integrated into the lower priority master or default bus master. Upon request the bus is granted to the higher priority master.

When a sequence of indivisible accesses is required, granting of the bus is withheld until completion of the indivisible accesses associated with the instruction. An example is the TAS instruction where granting of the ownership of the bus to the other master is withheld until completion of all accesses associated with the TAS instruction. The granting of the bus is effectively blocked. The blocking is intrinsic in the TAS instruction. In other words, execution of the TAS instruction includes a block to the granting of bus ownership until completion of the TAS instruction. In each of these cases, granting of bus mastership is effectively locked until some criterion is satisfied.

Many CPUs have no explicit instruction which performs a locked sequence of accesses (i.e. a TAS type instruction), however, emulation of such a locked sequence is desirable. One implementation is in a LOCK/UNLOCK instruction. The LOCK/UNLOCK instruction causes the CPU to present a bus indicator or signal for interpretation by bus arbitration logic. The LOCK indication will allow the CPU to perform a sequence of indivisible accesses. The UNLOCK indicator will allow the bus arbiter to grant ownership to an alternate master.

Existing methods for allowing performance of a sequence of indivisible accesses prior to arbitration of the bus implement special instructions or external signals. Both of these methods require extra processor cycles to affect the bus blocking. It is desirable to implement a bus locking capability without the use of additional special instructions and/or external signals. The ability to implement a locking capability without additional external means will greatly simplify a data processing system.

OPERATION OF THE PRESENT INVENTION

The present invention incorporates a control bit within a data processor which is used to block the granting of bus arbitration and effectively serves to control bus arbitration. The control bit is used in accordance with a bus arbitration state machine that describes the method used by an arbiter in resolving incoming bus requests. Under software control, the arbitration state machine may be directed to withhold the granting of the external bus to a higher priority master for the duration of a number of external accesses and then to perform arbitration in a normal fashion after ownership is released.

The present invention offers a simplified approach to bus arbitration in that no special instructions or LOCK indicators are used. Additionally in one embodiment of the present invention the arbitration logic is contained on-chip.

DETAILED DESCRIPTION OF PREFERRED FIGURES

Figure 1:
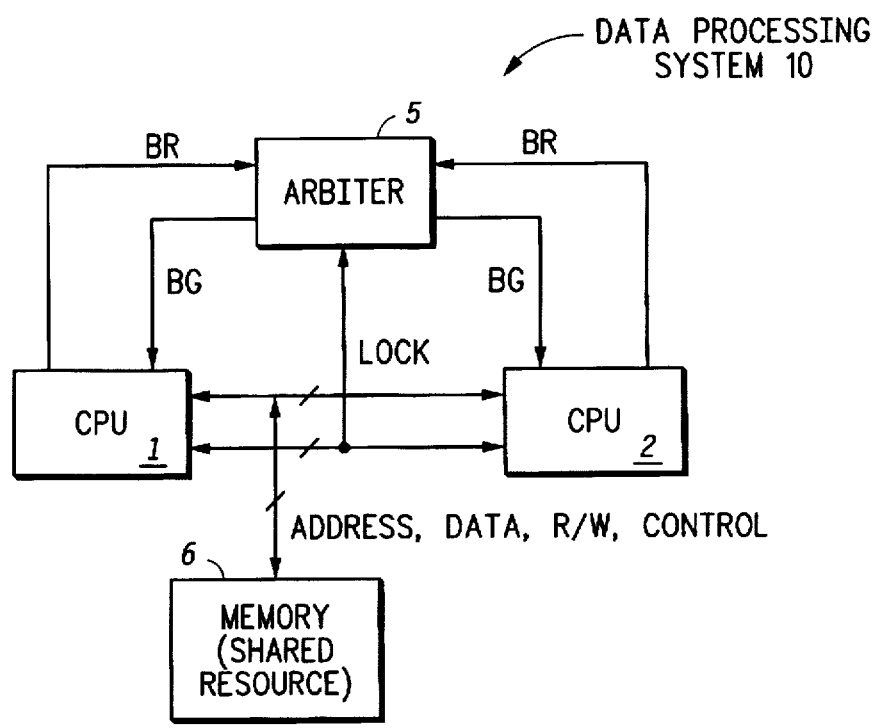
FIG. 1 illustrates, in block diagram form, a data processing system according to the prior art.

FIG. 1 illustrates a data processing system 10 according to the prior art. In FIG. 1, CPU 1 and CPU 2 are competing masters for control of the bus which carries address, data, read/write and control information to memory 6. Memory 6 is a shared resource. CPU 1 and CPU 2 are bi-directionally coupled to each other and to memory 6 by way of multiple buses. CPU 1 is coupled to arbiter 5 which receives bus request signals (BR) from CPU 1. After resolution of bus arbitration in favor of CPU 1, arbiter 5 then provides a bus grant signal (BG) to CPU 1. Likewise, CPU 2 provides BR signals to arbiter 5, and after resolution of bus arbitration in favor of CPU 2, arbiter 5 provides a BG signal to CPU 2.

The arbiter must resolve upon receipt of a BR signal which master is to gain ownership of the bus. Data processing system 10 of FIG. 1 is illustrative of a multiple processor system which may include any number of masters, each coupled to arbiter 5 for communication of BR and BG signals. Note also that arbiter 5 may be resident on another processor. Data processing system 10 may also include any number of shared resources, which may include other memory devices, other logic devices, or other shared system resources.

A LOCK signal is provided from either CPU 1 or CPU 2 to arbiter 5. A LOCK instruction indicates that the current owner of the bus desires to maintain ownership of the bus. Arbiter 5 responds by not transferring bus ownership while receiving the LOCK indicator.

Figure 2:
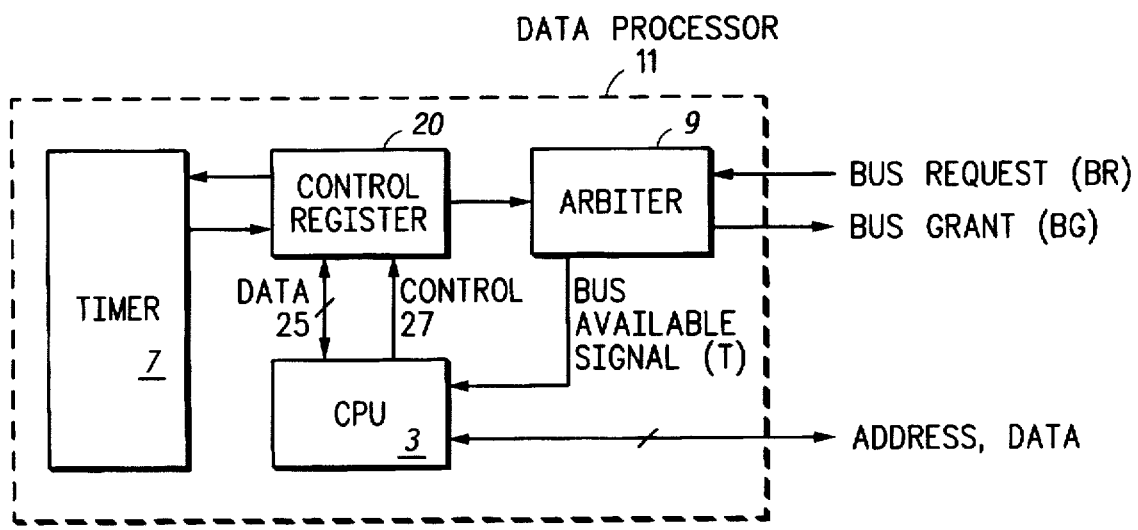
FIG. 2 illustrates, in block diagram form, a data processor in accordance with one embodiment of the present invention.

FIG. 2 illustrates a data processor 11 in accordance with one embodiment of the present invention. Arbiter 9, CPU 3, control register 20, and timer 7 are contained within data processor 11. Arbiter 9 receives bus request (BR) signals and provides bus grant (BG) signals external to data processor 11 by way of multiple unidirectional conductors. Arbiter 9 is coupled to CPU 3 by way of multiple uni-directional conductors. Arbiter 9 provides a bus available signal (T) to CPU 3. CPU 3 is coupled to control register 20 by way of a bidirectional data bus 25 and uni-directional control conductors 27. Control register 20 is coupled to timer 7 by way of separate unidirectional conductors; one to timer 7 and one to control register 20. CPU 3 communicates external to data processor 11 by way of an address and data bus.

Figure 3:
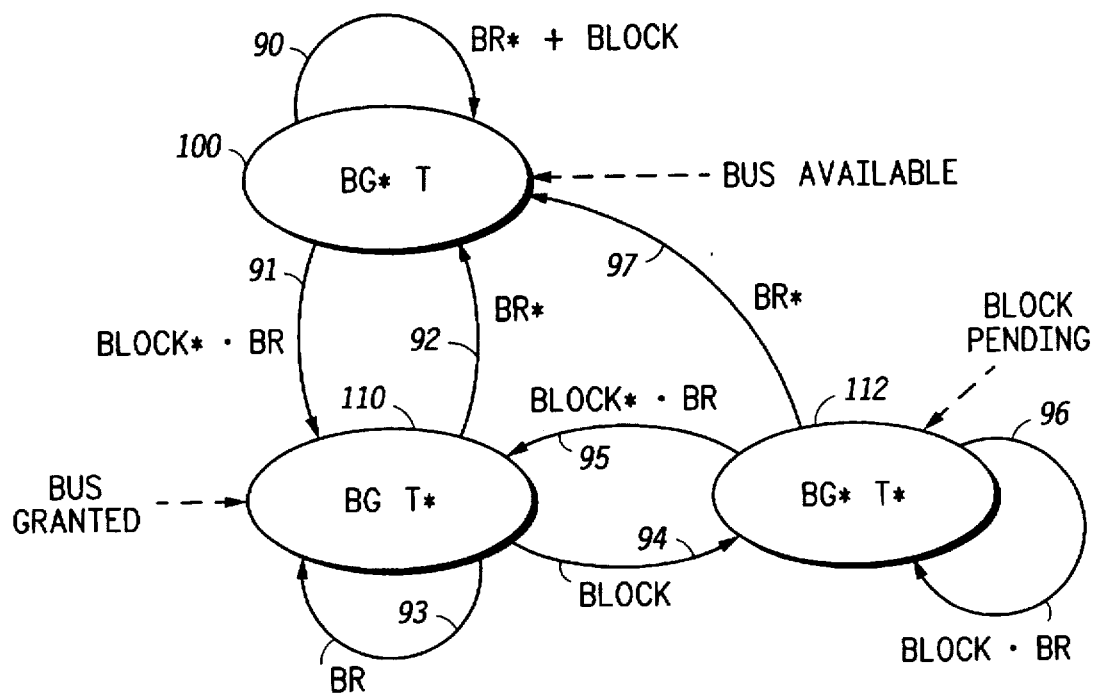
FIG. 3 illustrates, in state diagram form, the operation of the arbiter in the data processing system of FIG. 2, in accordance with one embodiment of the present invention.

FIG. 3 illustrates an arbitration state machine according to one embodiment of the present invention illustrated in FIG. 2. Bus arbitration of arbiter 9 of FIG. 2 begins in state 100 of FIG. 3 where ownership of the bus is available, bus grant (BG) is negated, and available signal (T) indicates the bus is available. If no BLOCK is asserted and a bus request (BR) is received, the state of arbiter 9 will transition along path 91 to state 110.

In state 110 the bus is granted, BG is asserted, and T is negated indicating the bus is not available. While in state 110 the continued assertion of bus request (BR) results in a transition via path 93 back to state 110. If a block is asserted, arbiter 9 will transition via path 94 from state 110 to state 112. While in state 110 negation of a bus request will result in a transition by way of path 92 back to state 100. While in state 100 if there is no request or if there is a BLOCK, flow will transition on path 90 back to state 100.

During state 112 a block is pending, BG is negated indicating no grant of the bus, and T is negated indicating the bus is not available. During a pending block the bus is effectively locked. While the block is asserted and a request is received, arbiter 9 will transition on path 96 back to state 112. If no bus request is received or a negate bus request is received, flow will continue from state 112 by way of path 97 and transition to state 100. Also, while in state 112, if a BLOCK is negated and a BR received, arbiter 9 will transition from state 112 to state 110 via path 95.

Figure 4:
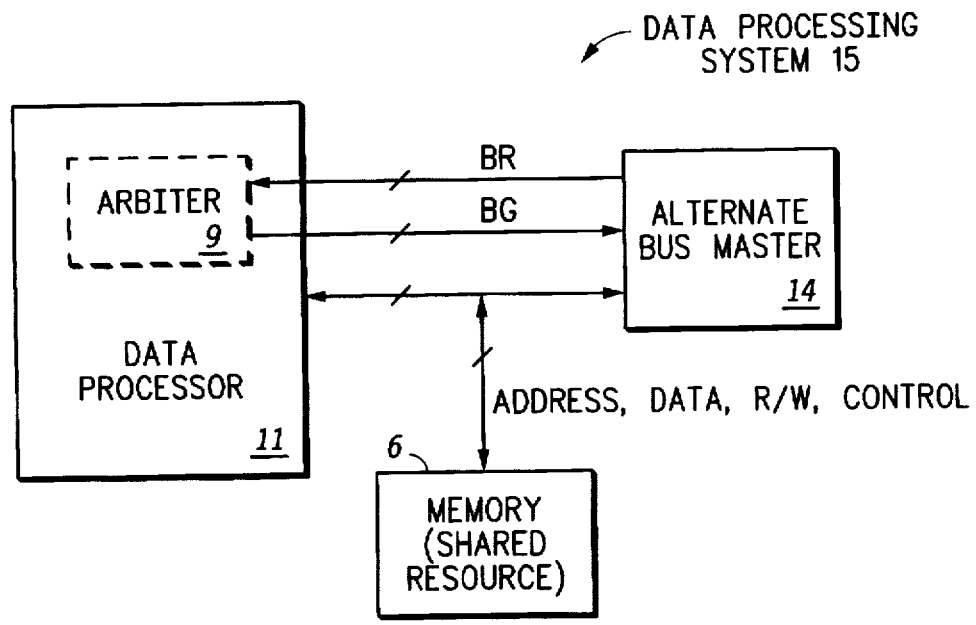
FIG. 4 illustrates, in block diagram form, a data processing system having the data processor of FIG. 2, in accordance with one embodiment of the present invention.

FIG. 4 illustrates a data processing system 15, according to one embodiment of the present invention, which includes data processor 11 from FIG. 2. Data processor 11 includes arbiter 9. Arbiter 9 is coupled to alternate bus master 14 by way of multiple unidirectional conductors for handling bus request signals and multiple uni-directional conductors for providing bus grant signals. Data processor 11 and alternate bus master 14 are coupled by way of bidirectional multiple conductors. Data processor 11 and alternate bus master 14 are both coupled to memory 6, which is a shared resource, by way of a bi-directional bus used to transfer address, data, read/write, and control information.

Figure 5:
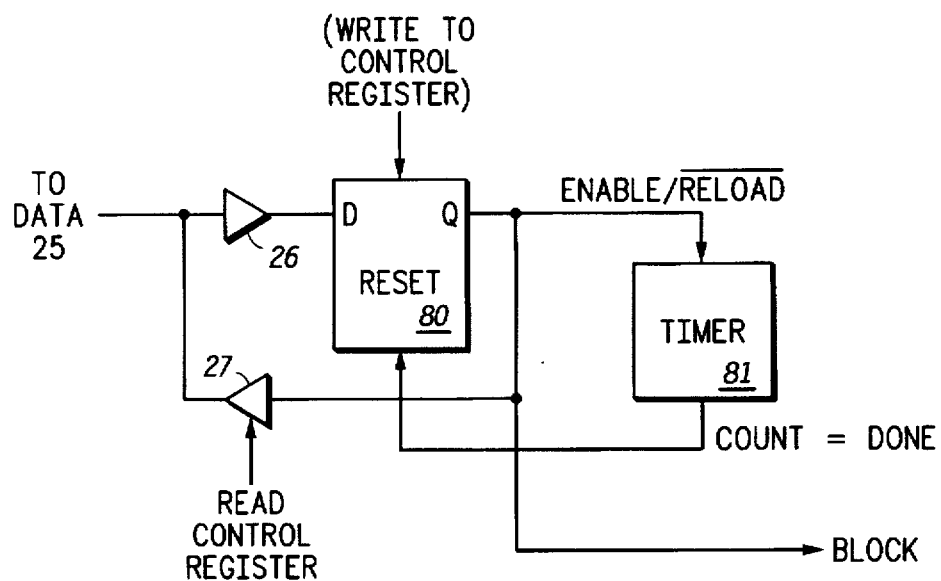
FIG. 5 illustrates, in block diagram form, arbitration circuitry in accordance with one embodiment of the present invention.

FIG. 5 illustrates the arbitration function according to arbiter 9 of one embodiment of the present invention illustrated in FIG. 2. Data is provided to gate 26 which is then coupled to flip-flop 80. The input to gate 26 is coupled to the output of gate 27. Gate 27 receives read information from the control register 20 (see FIG. 6). The input to gate 27 is coupled to the Q output of flip-flop 80. The Q output of flip-flop 80 is further coupled to the enable/reload input of timer 81. The output from timer 81, indicating a completed count, is coupled to the reset input of flip-flop 80. Flip-flop 80 also receives an input which indicates a write to control logic. In one embodiment of the present invention, the output Q of flip-flop 80 is also used to provide a block indicator. Note that in one embodiment of the present invention the signal T is active high signal, where negation of T indicates a block (i.e. the bus is NOT available.) Alternate embodiments may incorporate other indication schemes included within the context of the present invention, including active low, alternate definitions, and multiple signals. Signal T is an indication of the availability of the bus. In one embodiment of the present invention, signal T is determined by and provided by arbiter 9.

Figure 6:
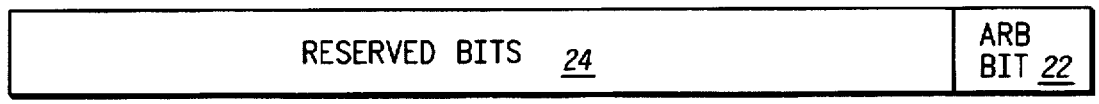
FIG. 6 illustrates, in block diagram form, a control register resident in the data processor illustrated in FIG. 2 in accordance with one embodiment of the present invention.

FIG. 6 illustrates a control register 20 in accordance with one embodiment of the present invention. Control register 20 includes reserved bits 24 and an arbitration signal, arbitration control bit 22 (ARB). ARB 22 is used to control the operation of arbiter 9 of FIG. 2.

OPERATION OF THE PREFERRED EMBODIMENT

In prior art applications, such as that illustrated in FIG. 1, external circuitry was needed for the various competing masters of data processing system 10 to communicate with arbiter 5, specifically including connections to and from each of the potential bus masters. Also, between CPU 1 and CPU 2 were communication buses from which a LOCK signal could be conveyed to arbiter 5. The LOCK signal indicating to arbiter 5 a desire of one of the masters to block bus arbitration, in other words, to maintain the present bus ownership. The process is necessary for a single bus master which is a current owner of the bus to complete a sequence of inseparable cycles. The present invention allows such bus arbitration without the need of such external circuitry and allows for arbitration logic resident on-chip.

Referring to FIG. 2, arbiter 9 performs the bus arbitration functions necessary for data processor 11 to function with competing masters in a data processing system. Arbiter 9 receives bus request signals from the various competing bus masters. Arbiter 9 resolves the competing requests for bus mastership, selecting a next bus owner. Arbiter 9 then provides a bus grant (BG) signal to the next selected owner of the bus. Arbitration results are also provided to CPU 3 in the form of a bus available signal (T). The bus available signal T indicates to CPU 3 that the bus is not currently owned by another bus master.

Control register 20, as illustrated in FIG. 6, includes an arbitration control bit (ARB) 22. The arbitration control bit is used to indicate that CPU 3 desires to maintain bus mastership. Once CPU 3 writes via control conductors 27 to ARB bit 22 in control register 20, control register 20 information is available for arbiter 9 to read. Arbiter 9 will then withhold any bus grant signals from subsequent bus requests until the ARB signal is cleared.

Referring to FIG. 3, data processor 11 is initially in state 100 where the bus is available. While the bus is available, arbiter 9 will provide bus available signal T to CPU 3. Control register 20 provides a no block signal to arbiter 9 as long as ARB bit 22 is cleared. Any requests received from external to data processor 11 during this time will be responded to by arbiter 9 sending a BG signal. Receipt of a BR signal transitions arbiter 9 to state 110, where bus available signal is negated indicating that the bus is not available, and BG signal is provided to the requesting master. In state 110 the bus has been granted. From state 110, subsequent requests will be granted. However, if CPU 3 writes to ARB bit 22 in control register 20, the bus will be blocked. In one embodiment of the present invention, setting ARB bit 22 indicates a block of bus arbitration, and clearing ARB bit 22 indicates no block of bus arbitration. Referring to FIG. 3, BLOCK condition denotes a set ARB bit 22 (i.e. block of bus arbitration) and BLOCK condition denotes a clear ARB bit 22 (i.e. no block of bus arbitration). In the BLOCK condition case, arbiter 9 will transition from state 110 to state 112. In state 112 no bus grant signal is provided and the bus available signal to CPU 3 is inactive.

While in state 110, where the bus has been granted, if ARB bit 22 is clear and the request signal terminates, process will transition from state 110 by way of path 92 back to state 100 where the bus is again available. If processing has transitioned to state 112 no grant signal being provided and the bus available signal not asserted, clearing ARB bit 22 and receipt of a bus request signal will result in a transition by way of path 95 back to state 110 where the bus is granted. While in state 112 if ARB bit 22 remains set and a bus request is received the only transition will be via path 96 back to state 112. State 112 represents a state where a block is pending awaiting completion of a sequence of cycles or some other criterion. From state 112 if a bus request is negated, arbiter 9 will transition by way of path 97 back to state 100 where the bus is once again available. While in state 100 if no bus request is received or the block is asserted by setting ARB bit 22 in control register 20, arbiter 9 remains in state 100.

A system level application of one embodiment of the present invention is illustrated in FIG. 4, where data processing system 15 includes two competing masters, data processor 11 and alternate bus master 14, and their shared resource, memory 6. Bus arbitration within data processing system 15 is done by arbiter 9 which is resident in data processor 11. Alternate bus master 14 must request mastership of the bus by sending a bus request signal to arbiter 9. Arbiter 9 will respond by arbitrating bus mastership and once arbitration is resolved in favor of alternate bus master 14, arbiter 9 will provide alternate bus master 14 with a bus grant signal. Note that other bus masters may also be included in data processing system 15, arbitration being performed in a manner similar to that affecting alternate bus master 14. Data processing system 15 may include any number of bus masters as well as any number of shared resources.

Referring again to FIG. 2, CPU 3 of data processor 11 indicates a desire to block bus arbitration by causing ARB bit 22 of control register 20 to be set. Control register 20 controls arbiter 9 which handles incoming bus request signals. No additional instructions are necessary to perform this blocking of bus arbitration. In one embodiment of the present invention, control register 20 is part of chip select logic circuitry within data processor 11 responsible for controlling arbiter 9. Alternate embodiments may incorporate control register 20 anywhere within data processor 11.

The conditions under which CPU 3 requires the blocking of bus arbitration may be predetermined or implemented by software control. Incorporation of timer 7 allows predetermined conditions of a known cycle count to process as timer 7 counts to a completion value. The completion of the count indicating to control register 20 that ARB bit 22 is to be cleared, and the arbiter 9 may now grant bus ownership to another master.

In an alternate embodiment of the present invention, timer 7 is a watchdog timer, used to ensure consistent, proper operation of data processor 11. On a timer overflow a signal is generated to reset or clear ARB bit 22. The number of cycles causing an overflow is a predetermined number. The watch dog function is then additionally used to determine the time out period which resets arbitration by clearing ARB bit 22. Bus cycles may be predetermined and any other type of timer may be used to determine the arbitration time.

Other embodiments of the present invention incorporate control register 20 as a flip-flop or other type of logic. Other embodiments incorporate external glue logic instead of ARB bit 22. Note that in one embodiment of the present invention, control register 20 is included within a chip select unit of a data processor.

The present invention offers a method of arbitrating bus ownership which incorporates the needs a bus master to block bus arbitration for a term of processing cycles. One embodiment of the present invention uses a register for controlling an arbitration unit to block bus arbitration for a term of cycles.

The present invention eliminates much of the external circuitry required in prior art bus arbitration methods, while offering a flexible solution consistent with many data processor functions.

I claim:

1. A method of arbitrating bus ownership in a data processing system, the data processing system including a first bus master having a central processing unit (CPU), the method comprising the steps of:

providing an arbitration block indicator to an arbiter from internal to the first bus master, the arbiter being contained within the first bus master, the arbiter capable of receiving bus request signals and providing bus grant signals;

receiving a first bus request signal at a bus request input to the arbiter;

if the arbitration block indicator is a first value the arbiter asserting a bus grant signal; and if the arbitration block indicator is a second value the arbiter not asserting a bus grant signal.

2. A method as in claim 1, wherein the first bus master further includes a control unit which provides the arbitration block indicator to the arbiter.

3. A method as in claim 2, further comprising the steps of:
the CPU processing a first instruction;
determining a first arbitration block condition associated with the first instruction;
the CPU indicating the first arbitration block condition to the control unit; and the control unit modifying the arbitration block indicator according to the first arbitration block condition.

4. A method as in claim 3, wherein the first bus master further includes a timer, the method further comprising the steps of:

in response to the control unit modifying the arbitration block indicator to the second value the control unit providing an initiate count signal to the timer;

in response to receiving the initiate count signal the timer counting to a predetermined value;

upon completion of the predetermined value the timer providing a count complete signal to the control unit; and in response to receiving the count complete signal the control unit modifying the arbitration block indicator to the first value.

5. A method as in claim 4, wherein the predetermined value is a programmable value.

6. A method as in claim 3, further comprising the steps of:

the control unit receiving a second arbitration block condition from external to the first bus master; and the control unit modifying the arbitration block indicator according to the second arbitration block condition.

7. A method as in claim 2, wherein the first bus master further includes a chip select unit and the control unit is a part of the chip select unit.

8. A data processor comprising:

a central processing unit;

a control unit coupled to the central processing unit, the control unit receiving arbitration information from the central processing unit;

a bus arbitration unit coupled to the control unit, the bus arbitration unit receiving a bus request signal, in response to receiving the bus request signal the bus arbitration unit asserting a bus grant signal;

wherein if the arbitration information is a first value the control unit provides an arbitration block indicator to the bus arbitration unit; and wherein in response to receiving the arbitration block indicator the bus arbitration unit does not assert the bus grant signal.

9. A data processor as in claim 8, wherein the control unit comprises a control register having an arbitration bit.

10. A data processor as in claim 9, wherein the arbitration bit has an associated mnemonic "ARB".

11. A data processor as in claim 9, wherein if the arbitration information is the first value the arbitration bit is set, and if the arbitration information is a second value the arbitration bit is cleared.

12. A data processor as in claim 11, further comprising a timer coupled to the control register;

wherein in response to setting the arbitration bit the timer initiates a count to a predetermined value; and wherein upon the timer completing the count to the predetermined value the arbitration bit of the control register is cleared.

13. A data processor as in claim 9, wherein the arbitration unit provides a bus available signal to the central processing unit.

14. A data processor as in claim 9, wherein the central processing unit provides the arbitration information at the first value for processing at least one inseparable cycle instruction and provides the arbitration information at the second value for at least one separable cycle instruction.

15. A data processor as in claim 14, wherein the at least one inseparable cycle instruction is a read-modify-write instruction.

* * * * *